the cover page of US Patent 6,938,472 B2

(12) United States Patent
Kaushik et al.

(10) Patent No.: US 6,938,472 B2
(45) Date of Patent: Sep. 6, 2005

(54) STATIC PRESSURE CALCULATION FROM DYNAMIC PRESSURE FOR ROTARY AIR-DATA SYSTEM AND METHODOLOGY THEREFOR

(75) Inventors: Rajindar P. Kaushik, Shelton, CT (US); James A. Haesche, Avon, CT (US); Richard E. Versailles, New Hartford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 119 days.

(21) Appl. No.: 10/732,595

(22) Filed: Dec. 10, 2003

(65) Prior Publication Data

US 2005/0126279 A1 Jun. 16, 2005

(51) Int. Cl.⁷ ............................................. G01C 21/00
(52) U.S. Cl. .................... 73/187; 73/178 R; 73/204.11; 73/861.61
(58) Field of Search ................................ 73/178 R–187, 73/178 T, 204.11, 861.61–861.67

(56) References Cited

U.S. PATENT DOCUMENTS

| | | | |
|---|---|---|---|
| 3,332,282 A | * | 7/1967 | Daw ............................ 73/182 |
| 3,948,096 A | | 4/1976 | Miller |
| 4,360,888 A | * | 11/1982 | Onksen et al. ................. 73/182 |
| 4,893,261 A | * | 1/1990 | Flint et al. ..................... 73/182 |
| 5,025,661 A | | 6/1991 | McCormack |
| 5,423,209 A | | 6/1995 | Nakaya et al. |
| 5,610,845 A | * | 3/1997 | Slabinski et al. ............. 73/182 |
| 5,797,105 A | | 8/1998 | Nakaya et al. |
| 6,101,429 A | | 8/2000 | Sarma et al. |
| 6,253,166 B1 | | 6/2001 | Whitmore et al. |

* cited by examiner

*Primary Examiner*—Edward Lefkowitz
*Assistant Examiner*—Alandra Ellington
(74) *Attorney, Agent, or Firm*—Carlson, Gaskey & Olds

(57) ABSTRACT

A Rotary Air-data System (RADS) periodically samples pressure data from a main rotor blade mounted pitot-scoop integrated with a high accuracy pressure sensor to compute a velocity vector that is resolvable into the aircraft's coordinate system. Mathematical techniques are employed which provide accurate computations of static pressure without a static pressure sensor. The RADS also computes the direction of the relative wind which is particularly useful when the pilot executes hover or low speed, low altitude maneuvers in restricted visibility. The availability of relative wind velocity information coupled with navigation data enhances the ability of rotary aircraft to perform accurate low altitude hover, fire control and other autopilot maneuvers.

6 Claims, 5 Drawing Sheets

STATIC PRESSURE CALCULATION FROM DYNAMIC PRESSURE FOR ROTARY AIR-DATA SYSTEM AND METHODOLOGY THEREFOR

BACKGROUND OF THE INVENTION

The present invention relates to aircraft instrumentation, and more particularly to airspeed measurement systems for rotary wing aircraft.

Aircraft air-data information is required for aerodynamic control. Typically, aircraft speed is measured by pitot-static systems that provide indicated airspeed, that is, the ram or dynamic pressure compared to the static pressure for the particular altitude. The indicated airspeed provides information to the pilot for aerodynamic speed control.

Indicated airspeeds are dependent on air density and may be significantly different from true airspeed. Conventional systems generally measure indicated airspeed and use an air data computer or other calculating means to determine true speed. Several problems arise with existing devices as measurement accuracy is dependent on the alignment of the pitot head with the incoming airflow. At large yaw angles or at high angles of attack, significant errors may also be introduced. Additionally, the operating range of the pitot-static system is limited such that at low air speeds, the dynamic-static pressure differences may be too small for accurate readings.

Numerous devices have been developed to measure the low speed operation of rotary wing aircraft. Typically, these devices calculate indicated airspeed using complex computations of main rotor longitudinal and lateral cyclic pitch positions, along with collective pitch and tail rotor pitch. These devices typically require additional input data, such as inertial acceleration, inertial velocity, and wind velocity. The complexity, cost and weight of these types of systems have prevented the widespread acceptance of these systems.

Accordingly, it is desirable to provide an uncomplicated air-data system for a rotary wing aircraft that avoids the utilization of static pressure sensors while assuring accurate data over a broad range of airspeeds and directions.

NOMENCLATURE

| | |
|---|---|
| $P_T =$ | Total Pressure |
| $P_{TO} =$ | Steady State Pressure |
| $P_S =$ | Static Pressure |
| $\gamma =$ | Ratio of Specific Heat |
| $\rho =$ | Density |
| $\psi =$ | Phase angle |
| $V_T =$ | Air Speed |
| $V_R =$ | Rotor Velocity |
| $P_{T1} =$ | First Harmonic Pressure Pulse |
| $T_s =$ | Ambient Temperature |
| $R =$ | Gas Constant |
| $G =$ | Gravitational Acceleration |
| $N_r =$ | Rotor Speed |
| $MMA =$ | molecular mass of air |
| $T =$ | absolute temperature |
| $P_S =$ | static pressure |
| $N_R =$ | rotor rotational velocity |
| $1P =$ | blade crossing reference |

SUMMARY OF THE INVENTION

The Rotary Air-data System (RADS) according to the present invention provides airspeed information for a rotary wing aircraft over its complete operational flight regime at previously unattainable accuracy levels. The RADS periodically samples pressure data from a main rotor blade mounted pitot-scoop integrated with a high accuracy pressure sensor to compute a velocity vector that is resolvable into the aircraft's coordinate system.

Mathematical techniques are employed which provide accurate airspeed computations without a static pressure sensor along with inherent noise immunity such as the turbulent flow generated when the main rotor blade passes over the fuselage or tail wake.

The RADS performs the combined functions of a conventional air-data system, which historically experience significant accuracy degradation at low air speeds due to main rotor down wash and a low airspeed sensing system in integrated seamless manner. Airspeed information is sensed and computed from zero to airspeed up to the maximum flight speed of the aircraft.

The RADS also computes the direction of the relative wind. This is particularly useful when the pilot executes hover or low speed, low altitude maneuvers in restricted visibility. The availability of relative wind velocity information coupled with navigation data enhances the ability of rotary aircraft to perform accurate low altitude hover, fire control and other autopilot maneuvers.

The present invention therefore provides an uncomplicated air-data system for a rotary wing aircraft which avoids the utilization of static pressure sensors while assuring accurate data over a broad range of airspeeds and directions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
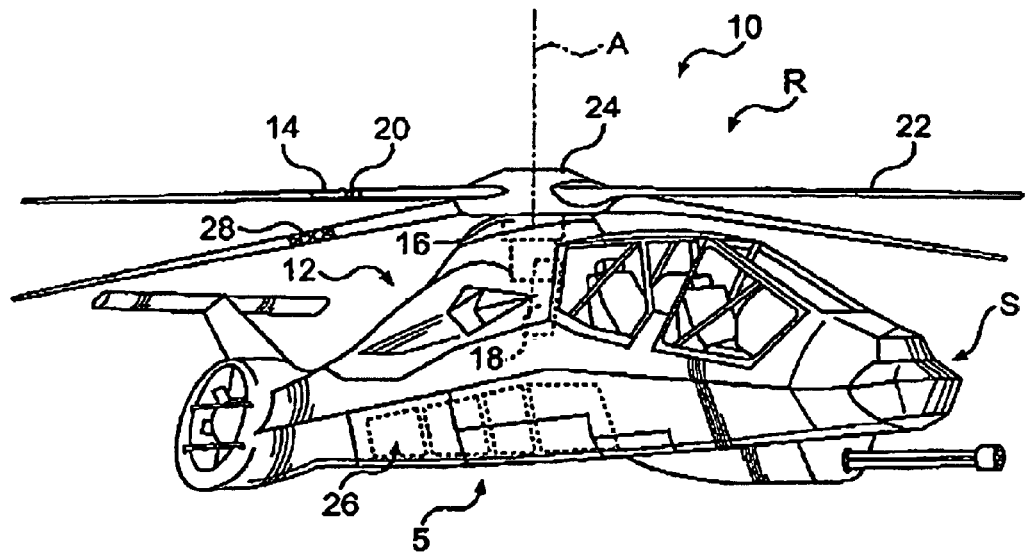
FIG. 1 is a general perspective view of an exemplary rotary wing aircraft embodiment for use with the present invention.

FIG. 1 schematically illustrates a vehicle 10 such as a RAH-66 Comanche helicopter, which includes a rotary air data system (RADS illustrated generally at 12). It should be understood that although a particular vehicle is disclosed in the illustrated embodiment, other vehicles would benefit from the instant invention.

Figure 2:
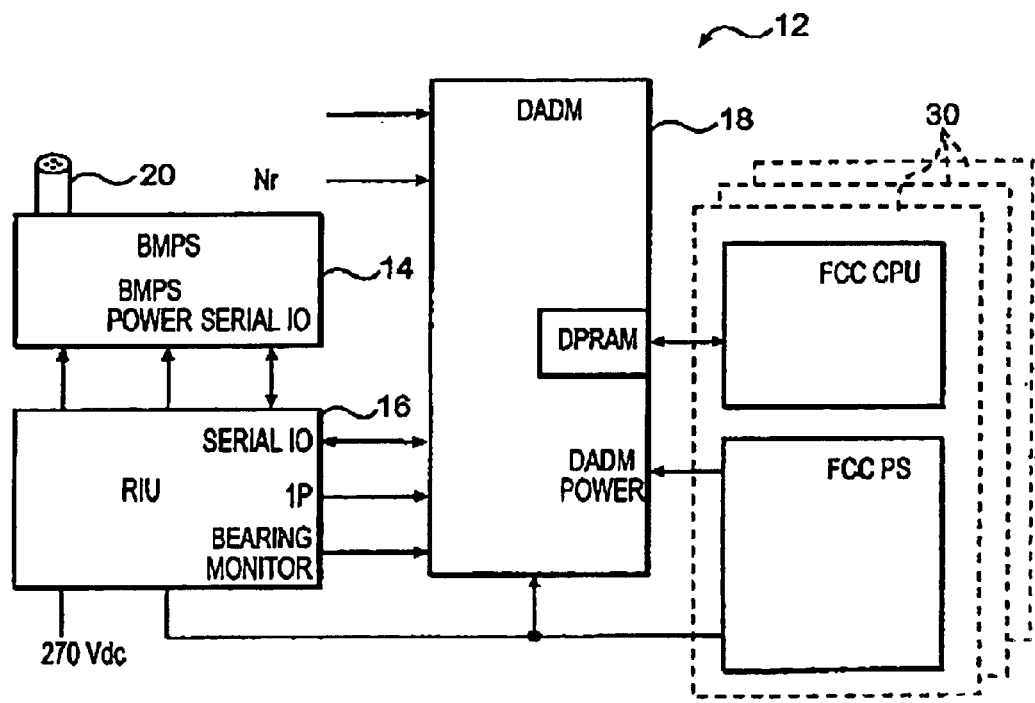
FIG. 2 is a block diagram of the Rotary Air-data System of the present invention.

The complete RADS 12 as installed on an aircraft preferably includes three separate channels that independently provide airspeed information to each of the three Flight Control Computers (FCCs) 30 (FIG. 2). Availability of three independent channels of air-data provides the potential to perform redundancy management.

The RADS 12 includes a Blade mounted Pressure Sensor (BMPS) 14 having a Pitot Scoop 20, a Rotary Interface Unit (RIU) 16, and a Digital Air Data Module (DADM) 18. A rotational field R includes a multiple of rotor blades 22 and rotor hub assembly 24 which rotate about an Axis A relative to a stationary field S defined by the vehicle airframe 26.

The BMPS 14 and Pitot Scoop 20 are mounted to one or more rotor blades 22 to collect dynamic air pressure during rotation of the rotor hub assembly 24. The RIU 16 transmits electrical power and control signals between the rotational field R and the stationary field S.

The rotor blades 22, which do not include a BMPS 14, include a Blade Mounted Counter Weight (BMCW) 28 to minimize unbalance of the rotor blades 22 mounted to the rotor head hub assembly 24.

The DADM 18 computes vehicle airspeed from signals generated by the BMPS 14 as sensed by the Pitot Scoop 20 (also illustrated in FIG. 2). The DADM 18 utilizes an inventive method by which the system 12 periodically samples pressure data from the main rotor blade mounted BMPS 14 and Pitot Scoop 20 which is resolvable into the aircraft's coordinate system through the aircraft flight control computer(s) 30. As will be further described, mathematical techniques are employed which provide accurate airspeed computations along with inherent noise immunity without a static pressure sensor.

The present invention eliminates a Static Pressure Sensor installation and computes the static pressure from dynamic pressure measurements. The mathematical computation process is explained through equations using the Total Pressure ($P_T$), Rotational Velocity ($V_R$), Ratio of specific Heat Constant ($\gamma$), Air Density ($\rho$), Computed Airspeed ($V_T$) and Temperature (T). All the parameters are known; therefore, Ps can be computed with the derived relationship each time the total pressure is sampled.

Finding Static Pressure from Total Pressure Measurements And Airspeed Calculations:

$$P_T = P_S \left[1 + \frac{\gamma - 1}{\gamma} \frac{1}{P_S} \frac{1}{2} \rho(V_T^2 + V_R^2 + 2V_R V_T \sin\psi)\right]^{\frac{\gamma}{\gamma-1}} \quad (1)$$

Figure 3:
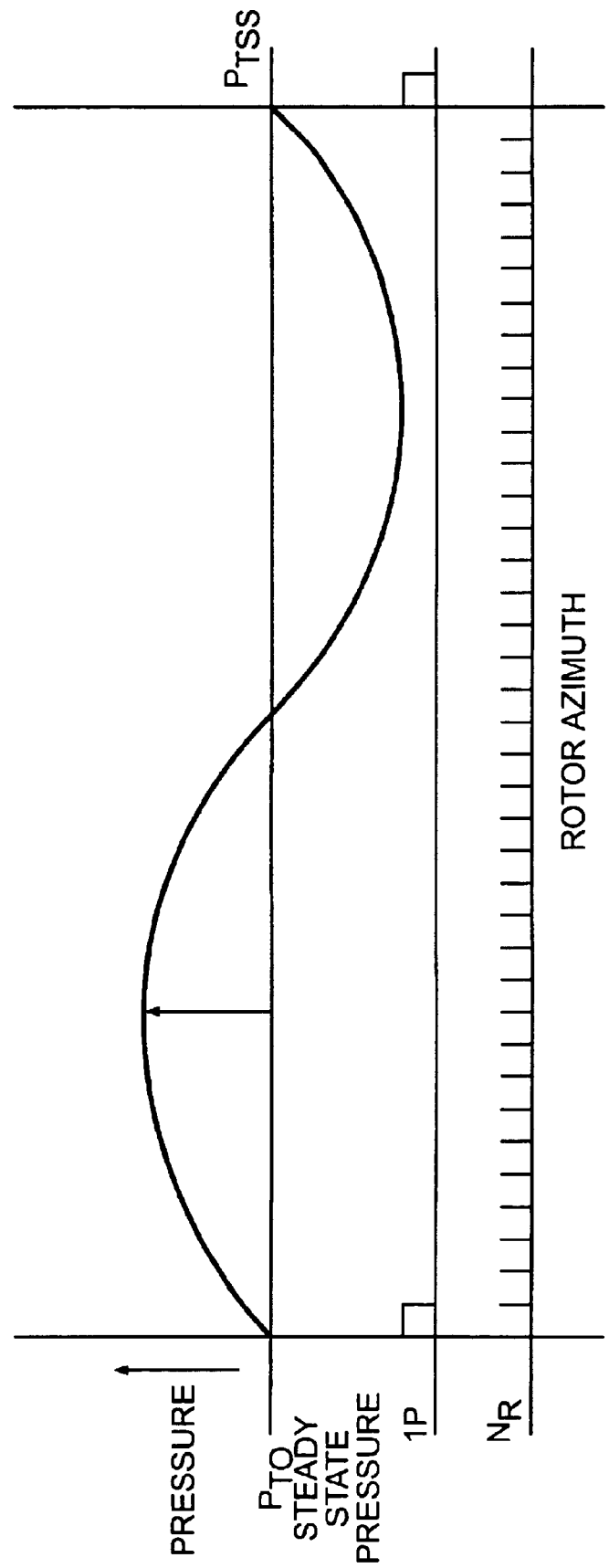
FIG. 3 is a pressure variation as a single rotor blade rotates through a complete rotation.

Where:

$P_T$=Total Pressure $V_T$=Air Speed $P_S$=Static Pressure $V_R$=Rotational Velocity $\gamma$=Ratio of Specific Heat $P_{T_1}$=First Harmonic Pressure Pulse $\rho$=Density $\psi$=Phase Angle FIG. 3 illustrates a pressure variation as a single rotor blade rotates through a complete 1P rotation. The implementation technique provided by the present invention permits discarding of the pressure data sampled as the main rotor blade passes turbulent flow created adjacent the fuselage and/or tail. That is, the pressure from the fuselage and/or tail will be a constant and therefore readily discernable.

Equation (1) can then be written as:

$$P_T^{\frac{\gamma-1}{\gamma}} = P_S^{\frac{\gamma-1}{\gamma}} \left[1 + \frac{\gamma - 1}{\gamma} \frac{1}{P_S} \frac{1}{2} \rho(V_T^2 + V_R^2 + 2V_T V_R \sin\psi)\right]$$

$$\text{Let } \dot{P}_T = P_T^{\frac{\gamma-1}{\gamma}}$$

$$\dot{P}_X = P_X^{\frac{\gamma-1}{\gamma}}$$

∴ the equation can be written as:

$$\dot{P}_T = \dot{P}_S \left[1 + \frac{\gamma - 1}{\gamma} \frac{1}{P_S} \frac{1}{2} \rho(V_T^2 + V_R^2 + 2V_T V_R \sin\psi)\right] \quad (2)$$

$$\rho = P_S \left(\frac{1}{gRT}\right)$$

Steady State Component $$\dot{P}_{T_0} = \dot{P}_S \left[1 + \frac{\gamma - 1}{\gamma}\left(\frac{1}{2gRT}\right)(V_T^2 + V_R^2)\right] \quad (3)$$

First Harmonic Component $$\dot{P}_{T_1} = \dot{P}_S \frac{\gamma - 1}{\gamma} \frac{1}{2gRT} 2V_R V_T \quad (4)$$

Therefore . . .

$$\dot{P}_S = \frac{\dot{P}_{T_0}}{1 + \frac{\gamma}{\gamma - 1}\left(\frac{1}{2gRT}\right)(V_T^2 + V_R^2)} \quad (5)$$

Such that the Static Pressure is:

$$P_s = \frac{(\dot{P}_{T_0})^{\frac{\gamma}{\gamma-1}}}{\left[1 + \frac{\gamma - 1}{\gamma} \frac{1}{2gRT}(V_T^2 + V_R^2)\right]^{\frac{\gamma}{\gamma-1}}} \quad (6)$$

Airspeed $V_T$ is determined from the $1^{st}$ Harmonic Component (Equation #4):

$$V_T = \frac{\dot{P}_{T_1}}{P_S^{\frac{\gamma-1}{\gamma}} \frac{\gamma - 1}{\gamma} \frac{V_R}{gRT}} \quad (7)$$

As the following are measured/calculated parameters or constants:

Total pressure $P_T$

Ambient Temperature $T_S$

Rotor Velocity $V_R$

Gas Constant R

Ratio of Specific Heat $\gamma$

Gravitational Acceleration g

The methodology for finding static pressure proceeds as follows:

i) Calculate $P_T$ (t) by finding $$\frac{\gamma-1}{\gamma}$$

root of measured $P_T(t)$ at each point in time.

ii) Extract steady state term $P_{T_0}$ and $1^{st}$ harmonic amplitude $P_{T_1}$.

iii) Calculate Static Pressure $P_S$ from equation 6 using previously calculated $V_T$ ($V_T=0$ initially)

iv) Calculate $V_T$ from equation 7 and compute $V_R$ knowing rotor speed and location of the BPMS on the blade from center of rotation.

v) Repeat steps iii and iv. ($V_T$ changes slowly enough that $V_T$ from previous data may be used.)

In addition to the normal computation of the airspeed, the RADS 12 computes the direction of the relative wind. This feature is most useful when the pilot must execute hover or low speed, low altitude maneuvers in restricted visibility. The availability of relative wind velocity information coupled with navigation data enhances the ability of rotary aircraft to perform accurate low altitude hover, fire control and other autopilot maneuvers.

Figure 4:
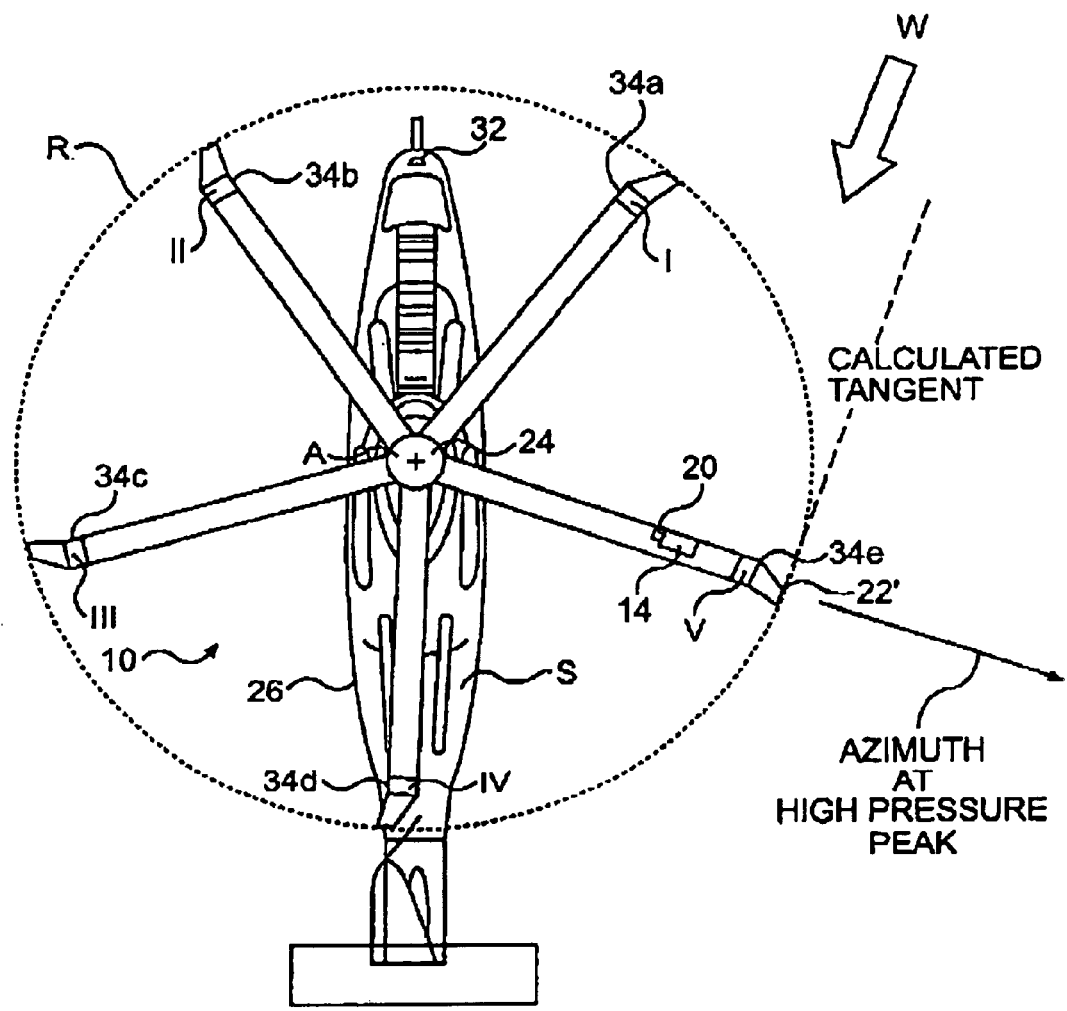
FIG. 4 is a top view illustrating wind direction determination performed by the Rotary Air-data System according to the present invention.

Referring to FIG. 4, the RADS 12 computes the direction of the relative wind by relating rotor blade position with total pressure. The highest total pressure $P_T$ is determined by determining where the highest total pressure $P_T$ is located relative to the azimuth position of the rotor blade.

The BMPS 14 and Pitot Scoop 20 are mounted to one or more rotor blades 22' to collect dynamic air pressure during rotation of the rotor hub assembly 24. A 1/Rev blade crossing reference sensor 32 is located on the airframe 26 to track the azimuth position of a distinct reflector 34a–34e to continuously track the position of each rotor blade 22. Although the sensor 32 is illustrated as being located on the aircraft nose, other locations, numbers and multiples of position sensors will likewise benefit from the present invention such as a single the 1/Rev blade crossing reference sensor located on a stationary part of the rotor head in combination with an rotor speed $N_R$ sensor mounted within the gearbox.

Figure 5:
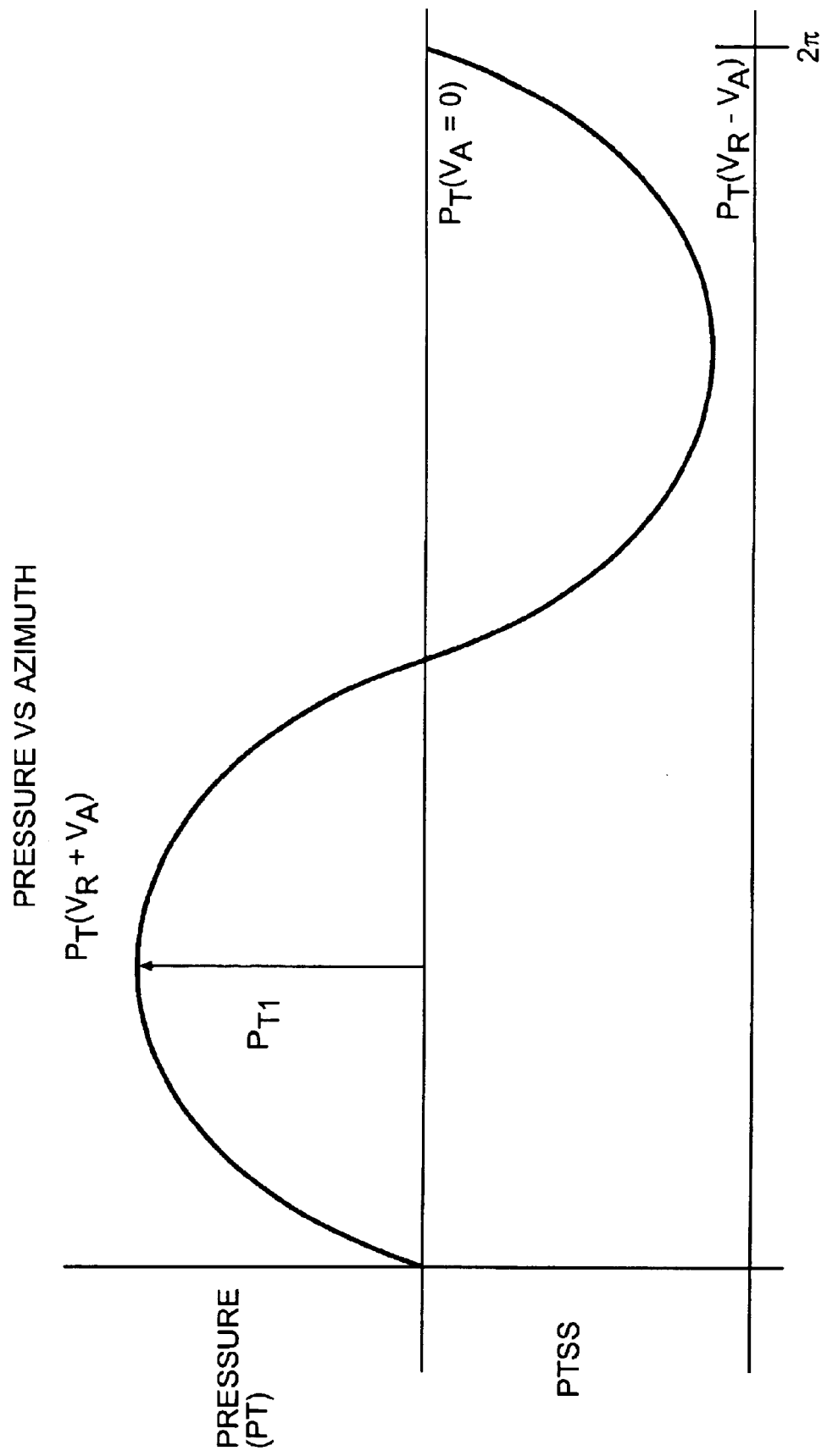
FIG. 5 is a pressure-azimuth representation as a rotor blade rotates through a complete rotation.

A high pressure peak (FIG. 5) occurs when the rotor blade 22' which mounts the BMPS 14 is heading directly into the relative wind (illustrated schematically by W; FIG. 4). Knowing the azimuth position of the blade 22' at which the high pressure peak of the total pressure $P_T$ occurs, permits a determination of the relative high wind direction W, the relative wind direction W is the inverse tangent of the azimuth position at which the high pressure peak of the total pressure $P_T$ occurs. The total pressure varies sinusoidal as the blade rotates in the wind. That is, the high pressure peak and thus the wind direction W will be ninety degrees offset or perpendicular to the azimuth position of the blade 22' and directed into the blade 22'.

Figure 6:
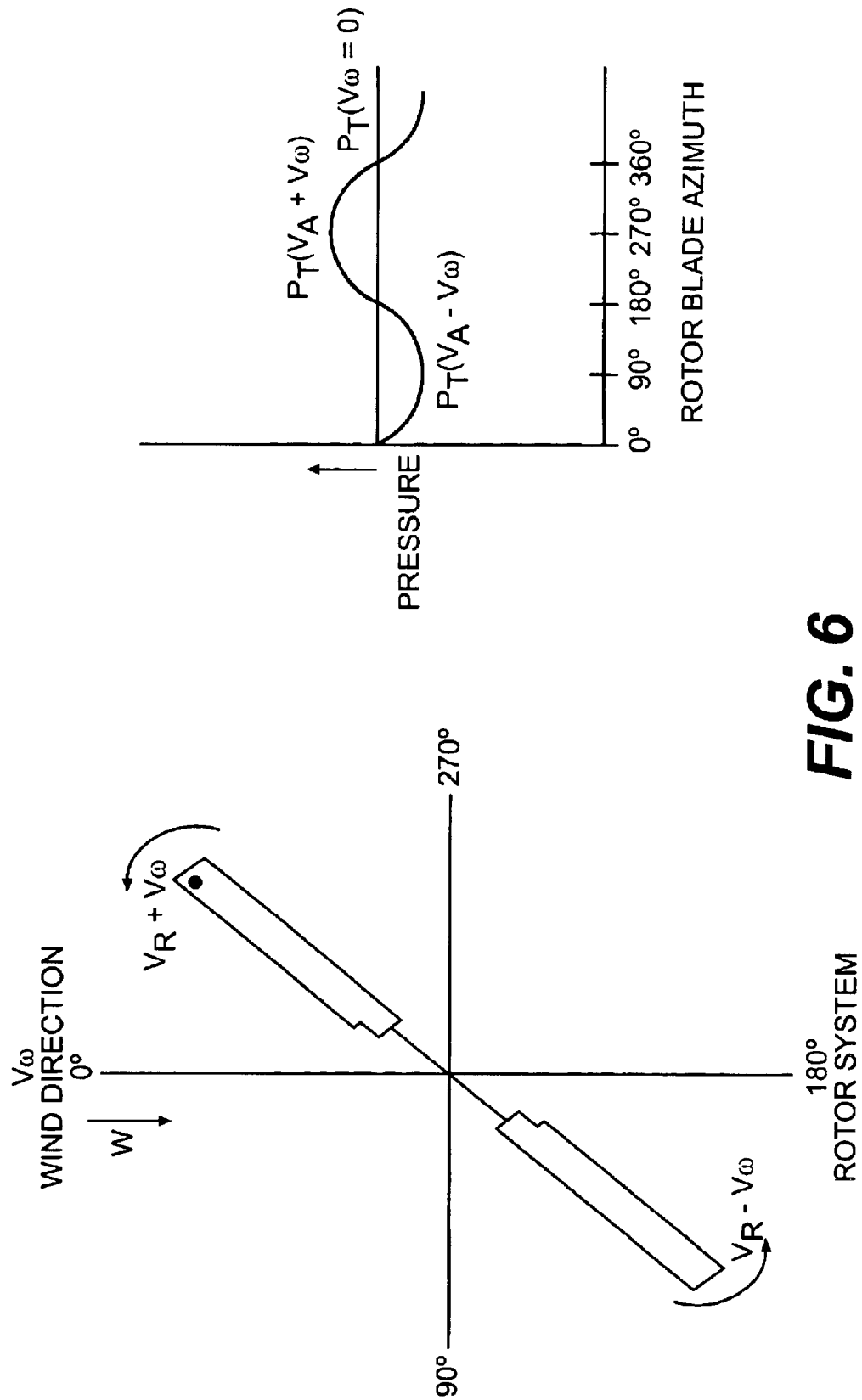
FIG. 6 is a pressure-velocity representation as a rotor blade rotates through a complete rotation.

As the following are measured/calculated parameters or constants:

θ=Azimuth Angle
ψ=Wind Direction Angle
L=blade radius to sensor 32
Vω=$V_A$ rotor angular velocity
$P_{T0}$ =$P_{TSS}$=steady state total pressure
$P_{T1}$=amplitude of the pressure variations
$V_R$=ω$θ_R$*L=Blade Mounted Pressure Sensor (BUTS) rotational velocity The function can be expressed as a Fourier series function and the wind direction W is extracted from the expression as an inverse tangent with respect to the blade position (FIG. 6). The Fourier series function is:

$$P_T = A_0 + A_1 \cos\theta + B_1 \sin\theta$$

The methodology for finding the wind direction proceeds as follows in which the single harmonic form is:

$$P_T = A_0 + C_1 \cos(\theta+\psi) = P_{TSS} + P_{T1} \cos(\theta+\psi)$$

Where $C_1 = \sqrt{A_1^2 + B_1^2}$
such that $$\text{Wind Direction} = \text{TAN}^{-1}\left(\frac{B1}{A1}\right).$$

It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of calculating air-speed with a sensor mounted in a rotational field comprising the steps of:
   i) obtaining a total pressure measurement within the rotational field;
   ii) calculate $P_T'(t)$;
   iii) extract steady state term $P_{T_0}'$ and $1^{st}$ harmonic amplitude $P_{T_1}'$;
   iv) calculate $P_S$ from $$P_s = \frac{(P_{T_O}')^{\frac{\gamma}{\gamma-1}}}{\left[1+\frac{\gamma-1}{\gamma}\frac{1}{2gRT}(V_T^2+V_R^2)\right]^{\frac{\gamma}{\gamma-1}}}$$

utilizing a previously calculated $V_T$ where $V_T$ initially 0; and
   v) recalculating $V_T$ with $P_S$ from said step iv); and
   vi) repeating said steps iv) and v).

2. A method as recited in claim 1, wherein said step (i) further comprises locating the sensor on a rotor blade.

3. A method as recited in claim 1, further comprising the step of: determining a relative wind direction.

4. A method as recited in claim 3, further comprising the step of:
   a) determining anazimuth position of a high pressure peak of the total pressure measurement;
   b) determining a tangent of the azimuth position of said step a).

5. A method as recited in claim 4, further comprising the step of:
   obtaining the azimuth position of said step a) from a rotor blade position sensor.

6. A method as recited in claim 5, further comprising the step of:
   locating the rotor blade position sensor within a stationary field adjacent the rotational field.

* * * * *

UNITED STATES PATENT AND TRADEMARK OFFICE
CERTIFICATE OF CORRECTION

PATENT NO. : 6,938,472 B2
DATED : September 6, 2005
INVENTOR(S) : Kaushik et al.

It is certified that error appears in the above-identified patent and that said Letters Patent is hereby corrected as shown below:

Column 6,
Line 54, "anazimuth" should be -- an azimuth --.

Signed and Sealed this

Twenty-ninth Day of November, 2005

JON W. DUDAS
*Director of the United States Patent and Trademark Office*